United States Patent
Planson (10) Patent No.: US 12,374,226 B2
(45) Date of Patent: Jul. 29, 2025

(54) VEHICLE CONTROL

(71) Applicant: Addison Lee Limited, London (GB)

(72) Inventor: Thomas Planson, London (GB)

( * ) Notice: Subject to any disclaimer, the term of this patent is extended or adjusted under 35 U.S.C. 154(b) by 86 days.

(21) Appl. No.: 17/781,677

(22) PCT Filed: Dec. 1, 2020

(86) PCT No.: PCT/GB2020/053077
§ 371 (c)(1),
(2) Date: Jun. 1, 2022

(87) PCT Pub. No.: WO2021/111120
PCT Pub. Date: Jun. 10, 2021

(65) Prior Publication Data
US 2023/0005375 A1    Jan. 5, 2023

(30) Foreign Application Priority Data

Dec. 2, 2019 (GB) .................................... 1917581

(51) Int. Cl.
G08G 1/00 (2006.01)
G05D 1/00 (2024.01)
G06Q 10/02 (2012.01)
G06Q 50/40 (2024.01)

(52) U.S. Cl.
CPC .......... *G08G 1/202* (2013.01); *G05D 1/0291* (2013.01); *G06Q 10/02* (2013.01); *G06Q 50/40* (2024.01)

(58) Field of Classification Search
CPC ........ G08G 1/202; G06Q 50/40; G06Q 10/02; G05D 1/0291
See application file for complete search history.

(56) References Cited

U.S. PATENT DOCUMENTS

| 9,754,490 | B2 * | 9/2017 | Kentley | ................. G06Q 10/02 |
| 9,805,431 | B2 | 10/2017 | Scicluna | |
| 11,062,415 | B2 | 7/2021 | Scicluna | |
| 11,132,626 | B2 | 9/2021 | Ryan et al. | |

(Continued)

FOREIGN PATENT DOCUMENTS

| CN | 102831769 | 12/2012 |
| CN | 105631551 A | 6/2016 |

(Continued)

OTHER PUBLICATIONS

International Search Report and Written Opinion for PCT/IB2016/051006 dated May 31, 2016; 11 pps.

(Continued)

*Primary Examiner* — Huan Le
(74) *Attorney, Agent, or Firm* — Michael Downs; Downs IP Law LLC (57) ABSTRACT

A computer-implemented method of managing a fleet of autonomous vehicles is provided. The method comprises receiving at least one request for a passenger journey from a client device associated with a passenger and allocating an autonomous vehicle to the passenger from the fleet. Confirmation that the autonomous vehicle has reached the passenger is then received and one or more vehicle status signals are received from the autonomous vehicle. Subsequently, the autonomous vehicle is authorised to proceed with the passenger journey in dependence on the vehicle status signals.

15 Claims, 5 Drawing Sheets

(56) References Cited

U.S. PATENT DOCUMENTS

| | | |
|---|---|---|
| 2002/0034292 A1 | 3/2002 | Tuoriniemi |
| 2003/0065556 A1 | 4/2003 | Takanashi et al. |
| 2003/0163330 A1 | 8/2003 | Podgumy |
| 2004/0093280 A1 | 5/2004 | Yamaguchi |
| 2004/0236501 A1 | 11/2004 | Hirose et al. |
| 2004/0267449 A1 | 12/2004 | Adamczyk |
| 2005/0144048 A1 | 6/2005 | Belanger |
| 2006/0059023 A1 | 3/2006 | Mashinsky |
| 2007/0050308 A1 | 3/2007 | Petri |
| 2007/0230374 A1 | 10/2007 | Altberg |
| 2008/0059252 A1 | 3/2008 | Boyer |
| 2008/0114629 A1 | 5/2008 | Pavlov |
| 2008/0125968 A1 | 5/2008 | Bradicich et al. |
| 2008/0195428 A1 | 8/2008 | O'Sullivan |
| 2008/0312822 A1 | 12/2008 | Lucas et al. |
| 2009/0172009 A1 | 7/2009 | Schmith et al. |
| 2009/0204600 A1 | 8/2009 | Kalik et al. |
| 2009/0313077 A1 | 12/2009 | Wheeler |
| 2011/0064211 A1 | 3/2011 | Wu |
| 2011/0099040 A1 | 4/2011 | Felt et al. |
| 2011/0246246 A1 | 10/2011 | Johnson |
| 2011/0313804 A1 | 12/2011 | Camp et al. |
| 2012/0016576 A1 | 1/2012 | Huang |
| 2012/0041675 A1 | 2/2012 | Juliver |
| 2012/0232943 A1 | 9/2012 | Myr |
| 2012/0239452 A1 | 9/2012 | Trivedi et al. |
| 2013/0013499 A1 | 1/2013 | Kalgi |
| 2013/0218647 A1 | 8/2013 | Kroll et al. |
| 2013/0246207 A1 | 9/2013 | Novak |
| 2013/0297463 A1 | 11/2013 | Garber |
| 2014/0026065 A1 | 1/2014 | Wang |
| 2014/0052645 A1 | 2/2014 | Hawes |
| 2014/0108201 A1 | 4/2014 | Frechette |
| 2014/0129951 A1 | 5/2014 | Amin |
| 2014/0180741 A1 | 6/2014 | Franke |
| 2014/0309815 A1 | 10/2014 | Ricci |
| 2014/0365096 A1 | 12/2014 | Cooper et al. |
| 2015/0032485 A1 | 1/2015 | Nelson |
| 2015/0046083 A1 | 2/2015 | Maitra |
| 2015/0161564 A1 | 6/2015 | Sweeney |
| 2015/0161752 A1 | 6/2015 | Barreto |
| 2015/0223024 A1 | 8/2015 | Abuodeh |
| 2016/0132792 A1 | 5/2016 | Rosnow |
| 2016/0247109 A1 | 8/2016 | Scicluna et al. |
| 2016/0248914 A1 | 8/2016 | Lacey |
| 2016/0301698 A1 | 10/2016 | Katara |
| 2016/0342946 A1 | 11/2016 | Herraiz |
| 2016/0364812 A1 | 12/2016 | Cao |
| 2016/0364823 A1 | 12/2016 | Cao |
| 2017/0141873 A1 | 5/2017 | Mandeville-Clarke |
| 2017/0160092 A1 | 6/2017 | Botea |
| 2017/0169366 A1 | 6/2017 | Klein |
| 2017/0352125 A1 | 12/2017 | Dicker |
| 2018/0005144 A1 | 1/2018 | Lo |
| 2018/0060827 A1 | 3/2018 | Abbas |
| 2018/0060992 A1 | 3/2018 | Scicluna |
| 2018/0075566 A1 | 3/2018 | Lacey |
| 2018/0143027 A1 | 5/2018 | Schlesinger |
| 2018/0150772 A1 | 5/2018 | Ryan et al. |
| 2019/0095837 A1 | 3/2019 | Scicluna |
| 2020/0193348 A1 | 6/2020 | Scicluna et al. |

FOREIGN PATENT DOCUMENTS

| | | |
|---|---|---|
| GB | 2372845 | 9/2002 |
| KR | 20120002764 | 1/2012 |
| WO | WO2004047046 | 6/2004 |
| WO | WO2013038198 | 3/2013 |
| WO | WO2014036333 | 3/2014 |

OTHER PUBLICATIONS

Combined Search and Examination Report for Application No. GB1503084.4 dated Aug. 25, 2015; 6 pps.

English Abstract and Bibliographic Data for CN102831769 (website: http://worldwide.espacenet.com/publicationDetails/biblio? . . . ) download date Mar. 24, 2016; 1 pps.

English Abstract and Bibliographic Data for KR20120002764 (website: http://worldwide.espacenet.com/publicationDetails/biblio?CC=KR . . . ) download date Mar. 24, 2016; 1 pps.

Office Action for U.S. Appl. No. 15/051,920 dated Sep. 15, 2016; 8 pps.

Final Office Action for U.S. Appl. No. 15/051,920 dated Mar. 17, 2017; 8 pps.

Office Action for U.S. Appl. No. 15/051,920 dated Aug. 31, 2017; 9 pps.

Office Action for U.S. Appl. No. 15/051,948 dated Aug. 29, 2016; 27 pps.

Final Office Action for U.S. Appl. No. 15/051,948 dated Feb. 23, 2017; 15 pps.

Notice of Allowance for U.S. Appl. No. 15/051,948 dated Jun. 29, 2017; 30 pps.

Written Opinion for PCT/IB2016/051012 dated May 25, 2016, 11 pps.

"Decision support tools for ambulance dispatch and relocation", T. Andersson et al., Journal of the Operational Research Society, vol. 58, No. 2, Feb. 1, 2007 (Feb. 1, 2007), pp. 195-201.

"Solving the dynamic ambulance relocation and dispatching problem using approximate dynamic programming", Christian Bierwirth et al., European Journal of Operational Research, vol. 219, No. 3, pp. 611-621.

European Examination and Search Report for Application No. EP16754844.5 dated Jun. 29, 2018; 9 pps.

European Examination and Search Report for Application No. EP16754837.9 dated Jun. 29, 2018; 14 pps.

Website: "https://www.youtube.com/watch?v=T3qGB_eSAFs" Sherlock Taxi—Allocation Demo; published Mar. 28, 2014; access date Jun. 9, 2017.

Website: "https://vimeo.com/113022930" Addison Lee Auto Allocator; published Nov. 27, 2014; access date Jun. 9, 2017.

Website: "https://www.youtube.com/watch?v=ZVExf-Mz8Mo&t=1s" Addison Lee at Google PinPoint London 2012; published Nov. 12, 2012; access date: Jun. 9, 2017.

"Multi-Agent Real Time Scheduling System for Taxi Companies", Glaschenko et al, AAMAS 2009 • 8th International Conference on Autonomous Agents and Multiagent Systems • May 10-15, 2009 • Budapest, Hungary; pp. 29-36.

International Search Report for PCT/IB2016/051012 dated May 25, 2016, 3 pps.

Office Action for U.S. Appl. No. 15/051,956 dated Sep. 2, 2016; 27 pps.

Final Office Action for U.S. Appl. No. 15/051,956 dated Jan. 26, 2017; 31 pps.

Office Action for U.S. Appl. No. 15/051,956 dated Jun. 23, 2017; 36 pps.

Final Office Action for U.S. Appl. No. 15/051,956 dated Feb. 6, 2018; 34 pps.

Notice of Allowance for U.S. Appl. No. 15/051,956 dated Oct. 2, 2018; 9 pps.

Written Opinion and International Search Report for PCT/IB2016/051010 dated May 25, 2016; 9 pps.

Notice of Allowance for U.S. Appl. No. 15/051,920 dated Mar. 19, 2018; 9 pps.

Notice of Allowance for U.S. Appl. No. 15/051,920 dated Mar. 30, 2018; 5 pps.

Notice of Allowance for U.S. Appl. No. 15/051,956 dated Jun. 25, 2018; 9 pps.

Written Opinion for PCT/IB2016/051005 dated May 31, 2016, 7 pps.

International Search Report for PCT/IB2016/051005 dated May 31, 2016, 3 pps.

European Examination and Search Report for Application No. EP16754838.7 dated Sep. 25, 2018; 7 pps.

European Examination and Search Report for Application No. EP16754842.9 dated Jun. 25, 2018; 9 pps.

Office Action for U.S. Appl. No. 15/364,632 dated Apr. 3, 2019; 22 pps.

(56) References Cited

OTHER PUBLICATIONS

Office Action for U.S. Appl. No. 15/553,166 dated Aug. 8, 2019; 20 pps.
Office Action for U.S. Appl. No. 15/791,139 dated Oct. 4, 2019; 15 pps.
Final Office Action for U.S. Appl. No. 15/364,632 dated Dec. 6, 2019; 16 pps.
Final Office Action for U.S. Appl. No. 15/553,166 dated Mar. 26, 2020; 26 pps.
Office Action for U.S. Appl. No. 16/198,439 dated Dec. 31, 2018; 20 pps.
Notice of Allowance for U.S. Appl. No. 16/198,439 dated Sep. 3, 2019; 10 pps.
Notice of Allowance for U.S. Appl. No. 16/198,439 dated Nov. 1, 2019; 3 pps.
Notice of Allowance for U.S. Appl. No. 16/198,439 dated Nov. 14, 2019; 3 pps.
Interview Summary for U.S. Appl. No. 16/198,439 dated Jun. 3, 2019; 3 pps.
Final Office Action for U.S. Appl. No. 15/791,139 dated Apr. 16, 2020; 17 pps.
"Predetermine." Merriam-Webster.com Dictionary, Merriam-Webster, https://www.merriam-webster.com/dictionary/predetermine (Year:2020).
"Xconomy: Circulation, Uber Team Up to Get Patients to Doctor's Appointments," Jeff Engel, Newstex Trade & Industry Blogs, Sep. 27, 2016, https://dialog.proquest.com/professional/docview/1823371344?accountid=131444, Downloaded May 3, 2021, 3 pages.
English Abstract and Bibliographic Data for CN105631551A (website: http://worldwide.espacenet.com/publicationDetails/biblio? . . . ) download date Oct. 21, 2019; 14 pps.
Final Office Action for U.S. Appl. No. 15/364,632 dated Jul. 9, 2020.
Final Office Action for U.S. Appl. No. 15/553,166 dated Aug. 25, 2021.
Final Office Action for U.S. Appl. No. 16/742,287 dated May 4, 2021.
Interview Summary for U.S. Appl. No. 15/051,956 dated Apr. 26, 2017; 3 pps.
Interview Summary for U.S. Appl. No. 15/364,632 dated Apr. 23, 2021; 1 pps.
Non-Final Office Action for U.S. Appl. No. 15/553,166 dated Feb. 2, 2021.
Non-Final Office Action for U.S. Appl. No. 16/742,287 dated Nov. 23, 2021.
Non-Final Office Action for U.S. Appl. No. 16/742,287 dated Sep. 25, 2020.
Notice of Allowance for U.S. Appl. No. 15/364,632 dated Aug. 27, 2021.
Notice of Allowance for U.S. Appl. No. 15/364,632 dated May 11, 2021.
Notice of Allowance for U.S. Appl. No. 15/791,139 dated Mar. 24, 2021.
Notice of Allowance for U.S. Appl. No. 16/742,287 dated Apr. 11, 2022.

* cited by examiner

VEHICLE CONTROL

FIELD

The present invention relates to the management of vehicle resources in relation to vehicle requirements.

BACKGROUND

In the field of fleet vehicle management (e.g., delivery trucks, private hire vehicles, and taxis), historically customer bookings were made face to face or via telephone. A person requesting a booking would speak to a human operator who would record the booking details such as pickup and drop off locations, the number of passengers and a journey start time.

Vehicles and drivers were then allocated to bookings by a human operator, called a controller. The controller would be in contact with the drivers of vehicles of a fleet by voice channels (typically one shared voice channel) of a radio system, through which the controller and the drivers could speak with one another. The controller could ascertain the locations of drivers by requesting the drivers to provide their locations verbally. The controller could also enquire of drivers when they expected to drop passengers and thus become free again for fulfilling a booking. Drivers would be provided with details of bookings allocated to them by the controller verbally through the radio system. Such manual systems are still widely in use.

Attempts have been made to automate the actions of the controller, and further to automate the reporting of some vehicle characteristics such as location to the controller. However, in most instances such techniques still require drivers to acknowledge and authenticate the system at various stages in order to ensure successful and safe operation.

Increasingly, vehicles have autonomous driving capabilities. In order to take advantage of such capabilities in the management of a fleet of vehicles, improved techniques are required.

SUMMARY

According to a first aspect of the present disclosure, there is provided a computer-implemented method of managing a fleet of autonomous vehicles, comprising: receiving at least one request for a passenger journey from a client device associated with a passenger; allocating an autonomous vehicle to the passenger from the fleet; receiving, from the client device, confirmation that the autonomous vehicle has reached the passenger; receiving, from the allocated autonomous vehicle, one or more vehicle status signals; and authorising the autonomous vehicle to proceed with the passenger journey in dependence on the vehicle status signals.

As such, a fleet of vehicles can be managed in such a way as to ensure safety and/or other criteria are met before a passenger journey proceeds. By receiving confirmation from the client device that the autonomous vehicle has reached the passenger and receiving one or more status signals (optionally directly) from the vehicle, account can be taken by a centrally managed fleet of both vehicle and passenger requirements. For example, both passenger presence and vehicle readiness may be assessed prior to the vehicle proceeding on a scheduled journey.

In some examples, the vehicle status signals comprise one or more door status indicators. Additionally or alternatively, the vehicle status signals comprise one or more luggage compartment indicators. For example, the vehicle status signals may be used to confirm that doors and/or luggage compartments are closed before a journey proceeds. Moreover, signals from the doors and or luggage compartment may be used to infer additional information for later journey control. For example, signals indicating the opening and closing of the luggage compartment may be used to infer the presence of passenger luggage in the compartment.

The vehicle status signals may additionally or alternatively comprise one or more seat occupied indicators. Furthermore, they may additionally or alternatively comprise one or more seat belt engagement indicators. Signals of these kinds can be said to assist in ensuring passenger safety and also to identify the number of passengers within a vehicle in order to ensure efficient operation of the fleet.

In some embodiments, the method further comprises: identifying a user profile from the request, the user profile indicating one or more vehicle environmental preferences; and transmitting instructions to the allocated autonomous vehicle to comply with the vehicle environmental preferences. In some embodiments, the vehicle environmental preferences may comprise one or more of: temperature, lighting and audio preferences. In this manner, environmental conditions of the vehicle can be set prior to arrival at a passenger location. The can be particularly advantageous in respect of conditions which cannot be immediately altered; for example, arriving at a preferred temperature may require a period of temperature adjustment and performing this adjustment prior to reaching the passenger will improve passenger experience.

Optionally, the method may further comprise: transmitting one or more alerts to the client device in dependence on the vehicle status signals; receiving one or more passenger responses to the alerts from the client device; wherein authorising the autonomous vehicle to proceed with the passenger journey is further dependent on the one or more passenger responses. For example, a passenger may be alerted that an apparently occupied seat does not have a seatbelt secured; the passenger may confirm that the seat occupancy warning is the result of luggage present on the seat and that the vehicle is nonetheless safe to proceed. Many other types of alerts may be provided to passengers in dependence on vehicle signals in order to allow passenger response to control subsequent actions, and particularly whether the vehicle proceeds with the journey.

In some embodiments, the method may further comprise instructing the allocated autonomous vehicle to unlock one or more doors in response to receiving confirmation that the autonomous vehicle has reached the passenger. In this manner, the vehicle may be secured until it reaches the passenger.

The method may further comprise receiving confirmation from the allocated autonomous vehicle that the vehicle has reached a destination. Moreover, the method may comprise receiving confirmation from the client device that the passenger journey is complete. In some embodiments, subsequent to receiving confirmation that the passenger journey is complete, the method may comprise: receiving one or more further vehicle status signals from the allocated autonomous vehicle; and identifying the vehicle as empty in dependence on the one or more further vehicle status signals. The method may further comprise providing one or more further alerts to the client device in response to the one or more further vehicle status signals. As such, when a vehicle journey is complete, steps may be taken to confirm with a passenger that no further action is required. For example, a passenger may be alerted to luggage stored in the luggage compartment or additional information of interest/use.

In some embodiments, the method may comprise receiving one or more passenger responses to the further alerts from the client device; and identifying the vehicle as empty may be further dependent on the one or more passenger responses. For example, the passengers may confirm that there is no further action to be taken and/or that luggage has been removed from the vehicle. Once the vehicle has been identified as empty, the method may comprise returning the vehicle to a pool of vehicles for allocation.

Further aspects of the present disclosure provide a computer-implemented method of managing a fleet of autonomous vehicles, comprising: receiving at least one request for a passenger journey from a client device associated with a passenger; allocating an autonomous vehicle to the passenger from the fleet; and controlling environmental conditions within the allocated vehicle to match a passenger profile. Still further aspects provide a computer-implemented method of managing a fleet of autonomous vehicles, comprising: receiving a one or more requests for a passenger journey from a client device associated with a passenger; allocating an autonomous vehicle to the passenger from the fleet; receiving, from the allocated autonomous vehicle, one or more vehicle status signals; inferring vehicle occupancy from the received signals and authorising the autonomous vehicle to proceed with the passenger journey in dependence on the vehicle occupancy. For example, the vehicle may be authorised to proceed only if the vehicle occupancy matches a requested occupancy in the request for the passenger journey. Still further aspects provide a computer-implemented method of managing a fleet of autonomous vehicles, comprising: receiving at least one request for a passenger journey from a client device associated with a passenger; allocating an autonomous vehicle to the passenger from the fleet; receiving, from the client device, confirmation that the autonomous vehicle has reached the passenger; providing, to the autonomous vehicle, one or more notifications in dependence upon a profile associated with the passenger.

Further aspects of the present disclosure provide an apparatus having at least one processor and at least one memory having computer-readable code stored thereon which, when executed, controls the at least one processor to manage a plurality of networked vehicle resources by performing the method of the previous aspects. Still further aspects may provide a non-transitory computer-readable storage medium having stored thereon computer-readable code, which, when executed by computing apparatus, causes the computing apparatus to manage a plurality of networked vehicle resources, by performing the method of the first aspect.

The skilled person will recognize that the features of the aspects above may be combined as appropriate and that optional elements of the first aspect may also be applied to other aspects.

DETAILED DESCRIPTION

Overview

Embodiments of the disclosure provide a system that can integrate with a fleet of partially or fully autonomous vehicles. For example, autonomous vehicles can integrate with a control system such that safe and reliable operation is achieved without requiring additional user input or negating the autonomous capabilities of the vehicle.

Figure 1:
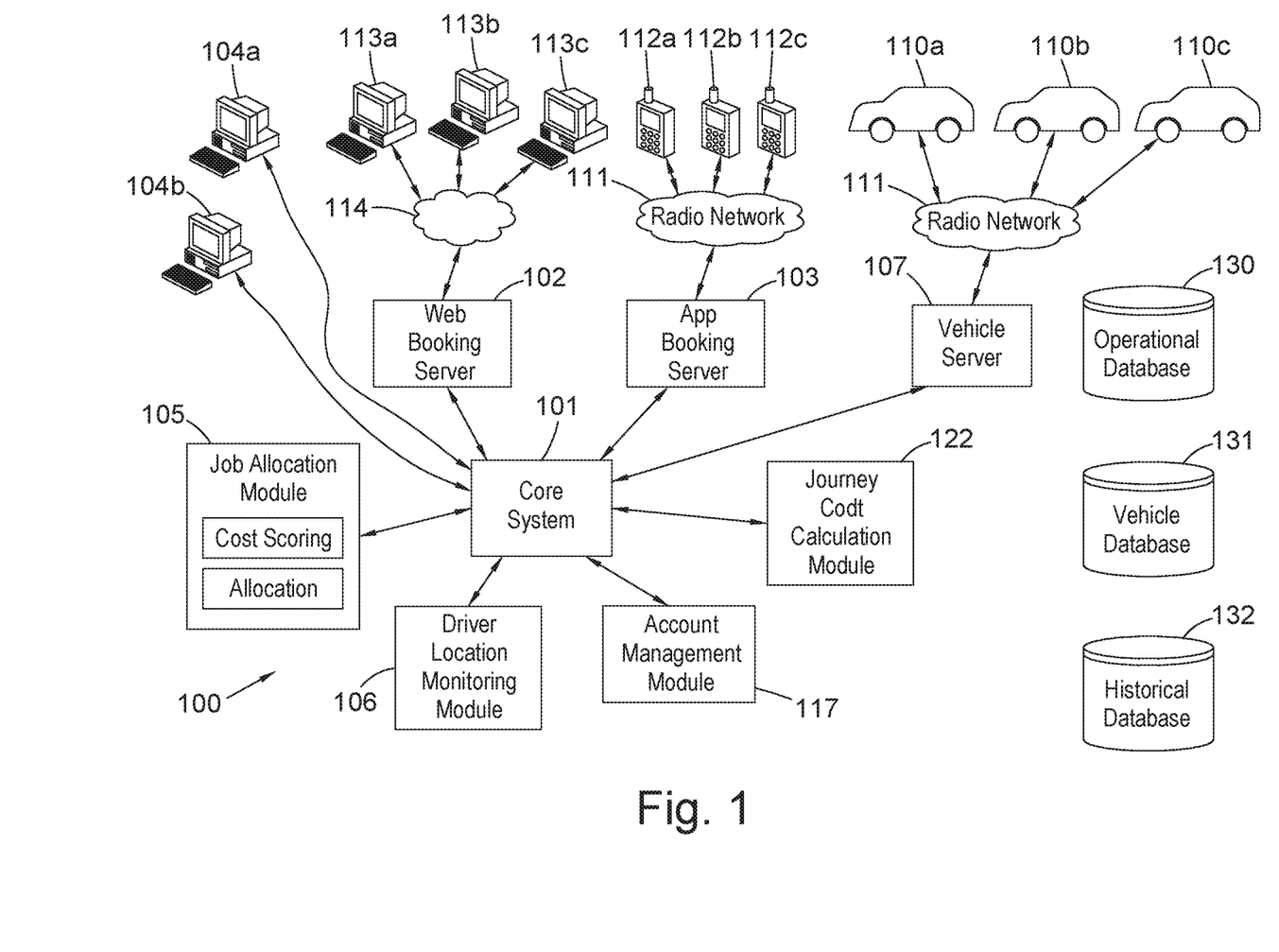
FIG. 1 is a schematic diagram of a system for management of a private hire vehicle service according to various aspects of the present invention.

FIG. 1a is a schematic diagram of a system for management of a private hire vehicle service according to various aspects of the present invention.

The system 100 includes a number of interconnected components, as will now be described. The system 100 includes at its centre a core system 101. This comprises one or more server computers running system software that ensures smooth operation of the system 100.

Key functions of the system wo are bookings, allocation of a private hire vehicle to a booking, vehicle management, account management and record keeping.

The booking function is provided primarily by a web booking server 102, an application booking server 103 and call centre terminals 104A and 104B, all of which are coupled to the core system 101.

The allocation function is provided primarily by a job allocation module 105, with information from other parts of the system 100.

The system includes database functions. In particular, an operational database 130 stores records that relate to general operation of the system 100. A vehicle database 131 stores records that relate to vehicles that are managed by the system 100. Lastly, a historical database 132 stores records that have been archived from the operational is database 130. Archiving of records from the operational database 130 to the historical database 132 occurs periodically and only records that are no longer needed for general operational use are archived.

The vehicle management function is provided primarily by a vehicle location monitoring module 106 and a vehicle devices server 107, with reference to the vehicle database 131 as well as other components of the system 100.

The account management function is provided primarily by an account management module 117, utilising accounts information stored in the operational database 130 along with other components of the system 100.

The operational database 130 stores details of every account held with the operator of the system 100. Each account is identified by an account number stored in the operational database 130. The accounts information stored in the operational database 130 may also include an account name, such as a company name and contact details for the company. The accounts information stored in the operational database 130 stores credit card details and/or other payment details so that payment can be taken from the account holder if permitted. A password and/or PIN (personal identification number) is associated with each account and stored with the accounts information in the operational database 130. Furthermore, a list of persons authorised to make bookings on the account may be stored, and optionally profiles for the individual authorised persons within the accounts.

The accounts information stored in the operational database 130 may also include a contact name and telephone number of a person who should be contacted in case of problems with the account. The accounts information stored in the operational database 130 includes information regarding invoicing preferences, for example the frequency of invoicing, date on which the invoice should be sent, the monthly/weekly credit limit and what information from each booking should be included on the invoice. The accounts information stored in the operational database 130 may indicate whether each account is active, or if it has been placed on hold. An account may be placed on hold by a credit control department and this may prevent further bookings being made on the account. Historical data of spending on the account may also be stored in the operational database 130, or this may be stored in the historical database 132.

The record keeping function is provided primarily by the historical database 132, although the operational database 130 and the vehicle database 131 also provide some record keeping function.

In brief, a fleet of private hire vehicles is managed by the system 100. Each vehicle has a respective record in the vehicle database 131, as will now be described.

The vehicle database 131 stores information about every vehicle in the fleet. The registration number (license plate number) of each vehicle is stored in the vehicle database 131. This may be used to identify each vehicle. Alternatively or in addition, a unique identifier separate from the registration number may be assigned to each vehicle as the primary means of identification within the vehicle database 131.

Each Service is defined according to its vehicle type, capacity and other characteristics. In some embodiments, these types are "Up to 4 passengers", "Up to 7 passengers", "Electric vehicle", "VIP" and "Up to 4 passengers with luggage". The vehicle database 131 stores the type of each vehicle and may also store a corresponding number or short string of characters which represents each type. Any special equipment such as a baby seat or the ability to accommodate a wheelchair is also identified in the vehicle database 131.

The vehicle database 131 stores the make and model and optionally the colour of each vehicle. The vehicle database 131 also indicates the current status of the vehicle. In some embodiments, the status is chosen from "Vehicle Pool", meaning that the car is in use, "Free Pool", meaning that the car is not currently being used and is free to be allocated and "Workshop", meaning that the car is undergoing maintenance or repair. The vehicle database 131 also stores the private hire license number (PCO) for each vehicle and the date on which this license expires as well as the road tax, vehicle insurance and MOT (vehicle roadworthiness certificate) expiry dates if appropriate. Examples of other data which may be stored are the date of purchase of the vehicle, the price paid for the vehicle, the date of manufacture, the supplier of the vehicle, warranty information and the date of the last inspection/maintenance.

Historic data about each vehicle may also be stored in the vehicle database 131, such as a record of the previous registration numbers. The service history and details of any accidents and repairs may also be stored.

Each vehicle has an associated control system 110 or autonomous mode controller, three of which are shown at 110A, 110B and 110C in the Figure. In the example shown, the vehicles are autonomous vehicles, also known as driverless vehicles or driverless cars. The autonomous mode controller controls the speed and direction of the autonomous vehicle and maintains an accurate record of the unmanned vehicle's location and orientation. Autonomous driving sensors may include any number of devices configured to generate signals that help navigate the vehicle while the vehicle is operating in an autonomous (e.g., driverless) mode. The autonomous vehicle may comprise a number of cameras and other sensors, including LIDAR and/or radar sensors, which feed information about the vehicle's surroundings to the on-board operating system. The information includes the position, constitution, orientation and velocity of nearby objects, including other vehicles. The autonomous driving sensors help the vehicle "see" the roadway and the vehicle surroundings and/or negotiate various obstacles while the vehicle is operating in the autonomous mode. The on-board operating system may communicate with the core system 101 via the radio network 111 using any suitable protocol. The autonomous mode control 110 may return additional vehicle status signals to the core system 101, including information about current passenger conditions and the status of doors, luggage compartments, seat belt and seat monitors etc.

The autonomous mode controller may be configured to control one or more subsystems while the vehicle is operating in the autonomous mode. Examples of subsystems that may be controlled by the autonomous mode controller may include a brake subsystem, a suspension subsystem, a steering subsystem, and a powertrain subsystem. The autonomous mode controller may control any one or more of these subsystems by outputting signals to control units associated with these subsystems. The autonomous mode controller may control the subsystems based, at least in part, on signals generated by the autonomous driving sensors.

The autonomous vehicles may have on-board route planning modules as part of the autonomous mode controller. Upon the autonomous vehicle receiving information representing a start and end location for a route, the on-board route planning module accesses the map and location database 109 and optionally traffic data in the historical database 132 and/or live traffic information to calculate a best route. The autonomous vehicle may also be given information representing one or more waypoints to travel to between the start and end locations, or a number of waypoints or locations which can be travelled to in any order. The route planning module may then calculate the most efficient route to take to visit each of the locations.

Alternatively, the autonomous vehicle may not have an on-board route planning module and may instead receive route information, i.e. information specifying one or more routes, or navigation instructions from the core system 101.

The control systems 110 are connected to the vehicle server 107 via radio network 111, which may for instance be a mobile phone (cellular phone) network. In this case, the control systems 110 are provided with subscriptions to the mobile phone network such that they can send digital data to and from the vehicle server 107.

The radio network 111 may alternatively be a dedicated radio network, for instance a private mobile phone network or a private radio network of some other type.

Data may be communicated between the control systems 110 and vehicle server 107 over any suitable communications link, for instance using a data channel of a cellular telephone network such as a GSM, EDGE, GPRS, UMTS, HSxPA or LTE network.

The control systems 110 are configured to report their locations at regular intervals, for instance 30 second intervals. The control systems 110 may include GPS (global positioning system) receivers, which calculate the locations of vehicles. Alternatively, they may include some other positioning module or device that is operable to calculate the positions of the vehicles with a suitable level of accuracy and resolution.

A private hire vehicle may be booked by a customer in one of three ways. Firstly, a private hire vehicle may be booked in a telephone conversation with a call centre operator. In this case, the customer initiates a telephone call with a call centre, an agent of which operates one of the call centre computer terminals 104A and 104B. The call centre agent then operates the terminal 104A, 104B so as to make the booking of the private hire vehicle according to the customer's requirements. The customer's requirements are obtained verbally during the telephone conversation between the customer and the agent.

In the second option, the customer may make the private hire vehicle booking using a browser application on a computing device 113, three examples of which are shown at 113A, 113B and 113C in the Figure. Each of the computing devices 113 is connected to the web booking server 102 by a network 114, which may for instance be the Internet or another public or private network. The web booking server 102 includes web server functionality that causes display of suitable web pages by the browser of the terminal 113. The customer's requirements with respect to the private hire vehicle booking are obtained by the web booking server 102 through the provision of suitable pages to the computer terminal 113 requesting the provision of the required information by the customer. The information may be provided by the customer through free text entry through the use of drop down lists, radio buttons etc. Some information may be pre-filled into the web pages provided by the web booking server 102.

Booking through the web booking server 102 may require the customer to login to a web portal before they can make their booking. The logging in may require the entering of a username and a password or PIN number. Through the control of a web session by the web booking server 102, for instance using cookies provided to the computer terminals 113, the booking can be known to have been validly made by virtue of the customer having being logged in to the web booking server at the time the booking was made.

The final way in which a customer can make a booking of a private hire vehicle is using a dedicated software application ("app") that is installed on and running on a portable communications device 112, three of which are shown at 112A, 112B and 112C in FIG. 1. The portable communications devices 112 may take any suitable form, but typically are smart phones, feature phones, tablet computers or personal digital assistants or such like. The communication devices 112 are coupled to the application booking server 103 by a radio network 111, which may be the same as the radio network 111 described above with relation to the control systems 110 and the vehicle server 107.

The application is configured to provide a user interface that allows the customer to provide the software application with the information required to make the private hire vehicle booking. For instance, the software application, when executed, may cause the display of interactive pages that allow the customer to select or enter the required information. The software application is configured also to communicate the information relating to the booking that has been provided by the customer to the application booking server 103. If based on information provided by the customer it is determined that the application booking server 103 requires additional information, the software application running the mobile device 112 is configured to provide an interactive display to the customer such that the customer can provide the information, following which the software application causes it to be provided to the application booking server 103.

The customer may be required to log in to the software application on the mobile device 112, prior to making a booking. Logging in to the software application may require a username and a password or PIN number. Alternatively, the username may be entered during set up of the application and may not need to be entered subsequently when this software application is executed. If the username is not required to be entered, the user may log in to the software application simply by entering the password or PIN number.

The information about the private hire vehicle booking that is obtained during the booking process is as follows.

Customer details. The customer details may be the name of the customer or an identifier that uniquely identifies the customer within the operational database 130.

Service type. This indicates the category of vehicle. For instance, the service type may indicate a vehicle of a standard type and having four seats, or a vehicle of a standard type and having seven seats. The service may alternatively indicate a VIP vehicle, or an environmentally-friendly (electric or hybrid) vehicle (also known as a green vehicle).

Journey type. The journey type may be a single (one-way) trip, or it may be a wait and return trip. The journey type may alternatively be a journey including multiple pick-up locations or multiple drop off locations or both multiple pick-ups and multiple drop off locations. The journey type may alternatively indicate that it is a pick-up from an airport or a drop at an airport.

Pick-up address. This indicates an address at which the customer is to be picked up at the beginning of the journey. The address is a natural language address. The address is selected from one of the plurality of addresses stored in a database. The addresses may be stored in the operational database 130 or the historical database 132, or they may be provided by an external address database service, for instance geo.me or qas.co.uk. The addresses each have associated therewith a verified coordinate location expressed in latitude and longitude. Multiple databases may be used (in a hierarchical fashion) for address lookup. The pick-up address may be selected by the customer in any suitable way, with the most appropriate way depending on whether the customer is using the software application on their mobile device, using the web booking service or using an agent in a call centre. If the journey type is an airport pick-up type, the pick-up address indicates the airport and terminal and optionally flight number.

Drop off address. The drop off address again is selected from one of multiple addresses stored in the database and is selected by the customer in any suitable way. If the journey type is an airport drop off type, the pick-up address indicates the airport and terminal and optionally flight number.

Pick-up date and time. This indicates a time and date which the customer requires the journey to start. Alternatively, the date and time may indicate ASAP (as soon as possible), if the customer requires the private hire vehicle at the earliest opportunity.

Optional information regarding the booking includes the following.

Customer's reference. This can be provided for instance as free text or selected from a drop-down menu. If a reference is provided, this information can be included in an account statement against a journey at a later date.

Additional comments. This is free text that provides any potentially relevant information, and may be provided for response once the booking has been allocated.

The system 100 comprises a journey cost calculation module 122. The cost calculation module 122 executes software code which determines the price for a requested journey, during the booking process and prior to vehicle allocation. Journey cost calculation is performed at the time of a booking and the result returned to the customer requesting the booking. The resulting cost for the journey is provided before the customer confirms the booking.

The journey cost calculation module 122 uses a number of different ways of calculating the base cost of the journey. The module 122 may set a fixed price for some journeys. These are agreed in advance with a particular account customer for journeys between pre-determined points. The cost calculation module 122 checks whether the booked journey and customer meet the requirements for a fixed price tariff. If the conditions are not met, then another pricing method is used. The cost calculation module 122 may use zonal pricing if a fixed price is not used. Where every point on the journey is within a defined zone, zonal pricing can be used. If neither fixed pricing nor zonal pricing is used, or if the conditions for their application are not met, then the cost calculation module 122 may use an A to B (A-B) pricing method. The A-B method may specify the number of units between points A and B. A unit price depending on the type of vehicle etc. is then used to calculate the price. If there is no A-B record for a particular journey, the crow fly (direct) distance (i.e. the length of a straight line between the pick-up and drop-off locations) is used to calculate the base cost for the journey. This method may use map grid references or alternatively may be based on GPS data, i.e. the latitude and longitude of the pick-up and drop-off points.

The cost calculation module 122 may retrieve all the map and location information needed to make these calculations from the historical database 132. The historical database 132 may store a detailed geospatial model of a particular region, such as a city. As an alternative, or in addition to the methods described above, the cost calculation module 122 may use the real road distance for the journey, which is calculated using the road map from the historical database 132 and a route planning algorithm. Different rates may be used for different parts of a single journey. For example a first per mile rate may be used for the first 10 miles of a journey and a second per mile rate may be used for the rest of the journey. The historical database 132 may also store information regarding speed limits and historical traffic data. This information may also be used by the cost calculation module 122 to calculate an estimated time for the journey. The estimated journey time may then form the basis of the cost calculation.

Other criteria used by the cost calculation module 122 when calculating the price are the type of vehicle (VIP, green, 7-seater etc.) including any special facilities the vehicle has, the method of payment and the date and time of the journey. The cost calculation module 122 may also apply a flat "pick-up fee" for every journey.

The allocation function allocates a vehicle to a booking. The allocation function is arranged to ensure a vehicle is allocated to the booking, and the associated customer, having regard to a number of factors including the pick-up location specified in the booking, the drop off location specified in the booking, the service type specified in the booking, the date and time specified in the booking, the geographical distribution of the vehicles that are managed by the system 100, and the demand for vehicles that are managed by the system 100.

The allocation function is automatic insofar as it does not require any manual involvement once the booking has been made. Once a job has been allocated to a particular vehicle, this is recorded in the operational database 130 with an indication that the journey has not yet been travelled.

The vehicle management function includes a number of features. These include the monitoring of vehicle in terms of distance travelled etc. and ensuring that they provided for mechanical servicing at appropriate times.

The accounts management function acts to manage information relating to customer's accounts with the operator of the system 100. This includes the maintenance and management of information such as authorised users, credit limits, invoicing requirement etc.

The record keeping function acts to store various information that is created by or observed by the system 100. This information includes information about bookings yet to be fulfilled, which is included in the operational database 130.

Figure 2:
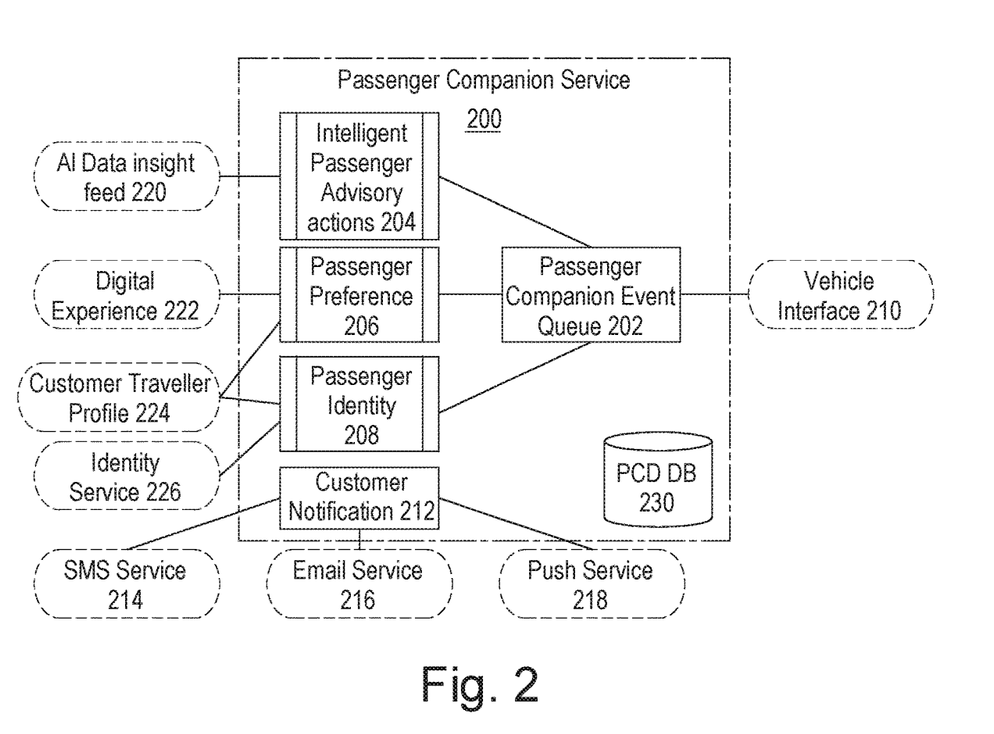
FIG. 2 illustrates a passenger companion service implemented by the system of FIG. 1
Figure 3:
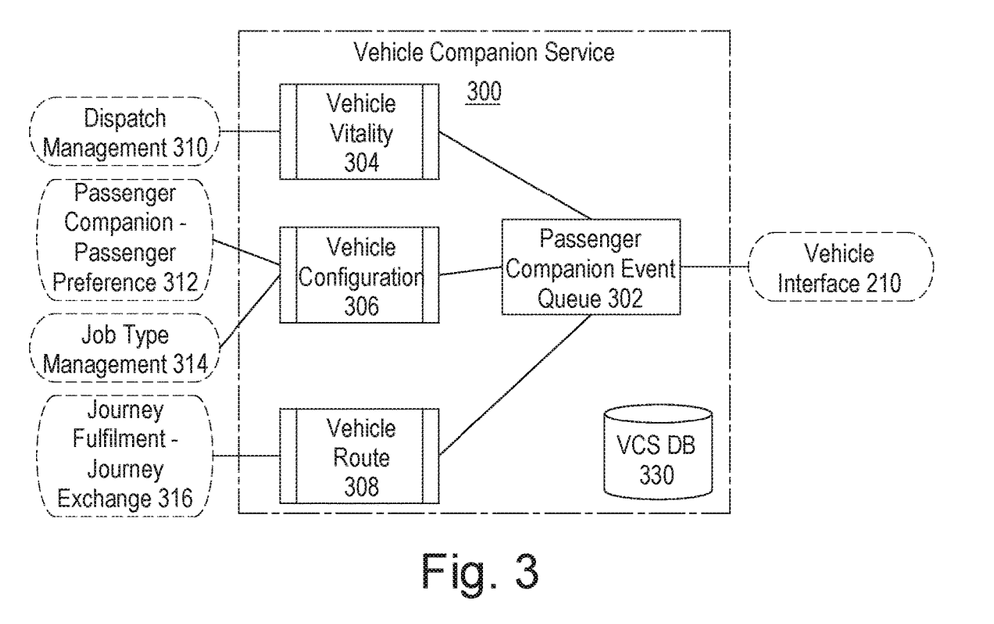
FIG. 3 illustrates a vehicle companion service implemented by the system of FIG. 1
Figure 4:
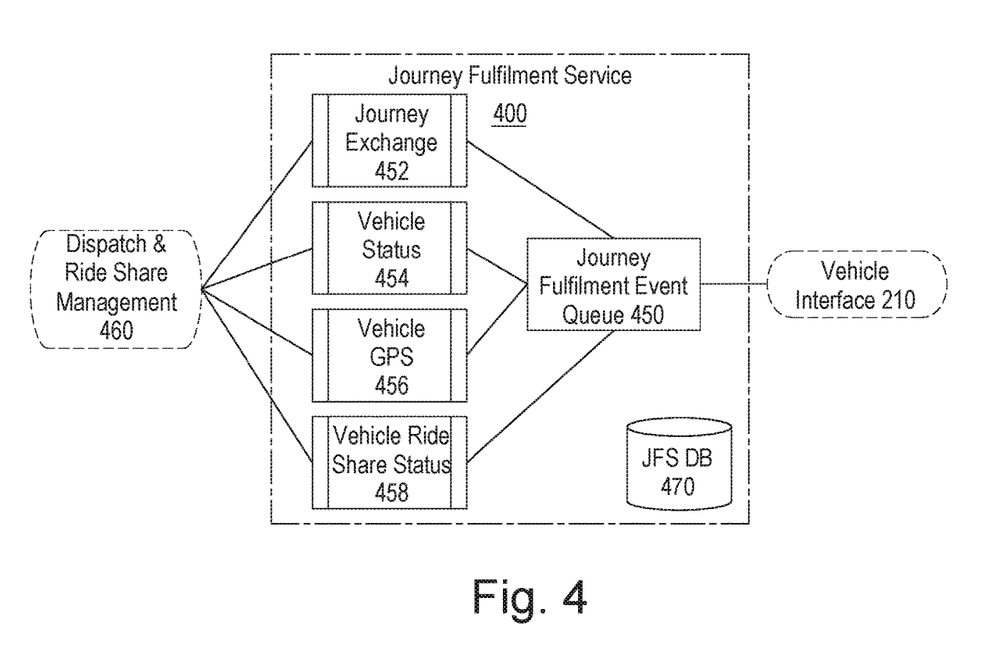
FIG. 4 illustrates a journey fulfilment service implemented by the system of FIG. 1.
Figure 5:
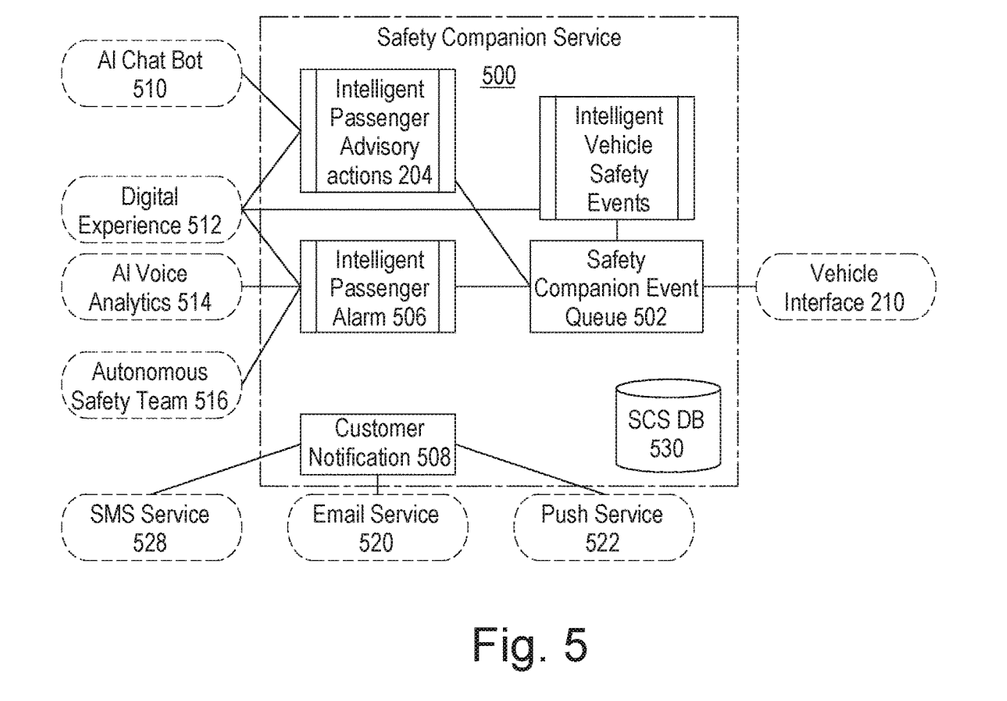
FIG. 5 illustrates a safety companion service implemented by the system of FIG. 1.

In order to take advantage of, and improve control in view of, the autonomous capabilities of the vehicles of the fleet under control, the system 100 may provide one or more autonomous vehicle services to complement the modules identified above. Examples of such services are illustrated in FIGS. 2 to 5. FIG. 2 illustrates a passenger companion service 200; FIG. 3 illustrates a vehicle companion service 300; FIG. 4 illustrates journey fulfilment service 400; and FIG. 5 illustrates a safety companion service 500. These services may be implemented across the distributed elements of the system 100 illustrated in FIG. 1.

The passenger companion service 200 of FIG. 2 may provide data to a user through user devices 112, for example, while also interfacing with vehicle control systems 110 at vehicle interface 210. In part this may relay information to a passenger but it also may provide an appropriate interface via which a passenger may optimise their experience. The passenger companion service 200 handles in car and out of car passenger experience through identity and passenger profile preferences combined with advisory prompts and additional information.

For example, a passenger companion event queue 202 may be implemented to receive vehicle status signals via vehicle interface 210 and provide instructions to the vehicle interface 210. The queue 202 may be in communication with a number of service functions. The service functions illustrated in FIG. 2 comprise intelligent passenger advisory actions 204, passenger preference 206, passenger identity 208 and customer notification 212. As illustrated, intelligent passenger advisory actions 204, passenger preference 206, passenger identity 208 functions may provide data to and receive data from user device 112 via an app through a number of channels such as an AI data insight feed 220, digital experience channel 222, customer travel profile channel 224 and identity service 226. The customer notification function 212 may provide notifications out of the app environment, through SMS service 214, email service 216 and additional or alternative push services 218. Also illustrated in FIG. 2 is passenger companion service database 230.

This architecture may operate to provide, for example, intelligent passenger advisory actions through the AI data insight feed 220. This may provide an in-app service, which can trigger messages and actionable points relating to multiple elements of a journey, such as:

Journey milestone events
Ride share notifications
Machine learning based journey facts
Machine learning based reward partnership deals Passenger preferences may include configurable stored preferences within the digital interface relating to journey/ride element of the customer journey. The digital experience channel 222 and customer traveller profile 224 illustrated in FIG. 2 may be used to implement the necessary data transfer. The passenger companion service 200 acts as an application programming interface to facilitate the operation of:

Pre-set passenger comfort preferences which may be set by customer traveller profile 224
    Vehicle environment
      Temperature
      Radio/play list
      Cabin trim lighting
      Cabin lighting
      Window Blinds
      Heated seat temperature
    Vehicle ride
      Ride mode
In journey Configurable preferences (in App)
    Vehicle environment
      Temperature
      Audio Preference
      Cabin trim lighting
      Cabin lighting
      Window Blinds
      Heated seat temperature
    Ride share participation
    Ride share passenger feedback Passenger identity control may be implemented using a digital identity profile via identity service 224, used for interacting with the vehicle to ensure safe identification & authorisation between the customer & vehicle. This may ensure secure passenger & vehicle pairing.

FIG. 3 illustrates a vehicle companion service 300. This may be used to optimise the vehicle fleet by aggregating the necessary data to manage the vehicle maintenance and allocation. This service may also instruct the car on the passenger preferences regarding environmental configurations.

The vehicle companion service 300 comprises a vehicle companion event queue 302 which may receive data from and transmit data to vehicle interface 210. This queue 302 may communicate with functions of vehicle vitality 304, vehicle configuration 306 and vehicle route 308. Each function 304, 306, 308 may communicate with appropriate data channels including dispatch management 310, passenger companion—passenger preference 312 (provided via the passenger companion service 200), job type management 314 and journey fulfilment—journey exchange 316. Also illustrated in FIG. 3 is vehicle companion service database 330.

The vehicle vitality function 304 may provide an event collection and processing service that consumes the vehicle status signals from the vehicle interface 210 in order to establish in real-time the vehicles capability to deliver a service whilst providing a predictive/real-time view of when a vehicle requires maintenance so it can be scheduled to keep the fleet efficiency at its maximum. The vehicle status signals used for this function may include:

Vehicle Engine/motor status, temperature, warning lights etc
Vehicle road condition, tyre pressure etc
Vehicle speed
fuel/charge level The vehicle configuration function 306 may facilitate the application of passenger preferences for a journey. In some examples, this functionality may be limited to circumstances in which the booking does not relate to a ride share service. The vehicle configuration function 306 may use a controller area network (CAN) bus to enable the passenger preference configurations to be applied to a non-ride share journey. A vehicle job type can be specified by the job management system and sent to the vehicle to switch modes between a journey fulfilment or subscription model.

The vehicle route function 308 may provide the dynamic journey coordinates for tracking the vehicle to complete not only the journey but the key maintenance journey elements.

The journey fulfilment service 400 of FIG. 4 comprises a number of distinct elements. Again, a queue is provided in communication with the vehicle interface 210, this time a journey fulfilment event queue 450. This queue is in communication with functions comprising: journey exchange 452, vehicle status 454, vehicle GPS 456 and vehicle ride share status 458. Each function 452, 454, 456 and 458 may be in communication with a dispatch & ride share management channel 460. Also illustrated in FIG. 4 is journey fulfilment service database 470.

The journey exchange function 452 allows journey booking details to be exchanged directly with the vehicle. A vehicle information system can be provided to indicate to passengers various information such as journey way points; estimated journey length in time and/or distance; and current journey progress.

The vehicle status function 454 may ensure that all necessary vehicle status information is taken into account by the dispatch management processes. For example, vehicle status signals may be received to indicate: booking accepted, vehicle arrived, passenger on board, on route to stop x, arrived at stop x, and journey complete. Furthermore, vehicle status signals may relate in particular to functionality associated with the autonomous nature of the vehicle, including: passenger token accepted, vehicle configured, vitality event, passenger leaving/left, passenger joined, vehicle charge/fuel range, door open, luggage compartment open, vehicle stopped, vehicle reset, vehicle ready, and vehicle maintenance mode.

The vehicle GPS function 456 acts to provide vehicle location to the system 100. This allows GPS coordinate to be processed to track the vehicle for fleet efficiency and safety.

The vehicle ride share status 458 may provide real-time seat availability that can be used to determine the vehicle's ability to participate in ride sharing allocation decision.

FIG. 5 illustrates the safety companion service 500. This service may be form part of the appropriate processes and procedures to ensure safety when operating autonomous (or driven) vehicles. The particular example described with reference to FIG. 5 provides one approach to facilitating safety compliance, but he skilled person will recognise that a safe system may be implemented in an alternative manner. In the context of autonomous vehicles it is also recognised that a customer's perception of safety is an important factor in allowing the efficient use of vehicle resources.

The safety companion service 500 comprises a safety companion event queue 502 in communication with the vehicle interface 210. Functions of the safety companion service 500 may comprise: intelligent vehicle safety events 502, intelligent passenger safety interaction 504, intelligent passenger alarm 506 and customer notification 508.

The application at the user device 112 may comprise a chat bot, and AI chat bot channel 510 may facilitate communication with the chat bot. The safety companion service 500 may also be in communication with channels digital experience 512, AI voice analytics 514 (which may provide data relating to voice communication either via the app or through a microphone incorporated into the vehicle) and an autonomous safety team 516 (which may be a staffed function overseeing the operation of the system 100). The customer notification function 508 may provide notifications out of the app environment, through SMS service 518, email service 520 and additional or alternative push services 522. Also shown in FIG. 5 is the safety companion service database 530.

The role of the intelligent vehicle safety events function 502 may be to ensure a passenger can safely enter and depart a vehicle and inform the vehicle it is safe to proceed for the configured journey. It may receive vehicle status signals from the vehicle interface providing the necessary information to provide this functionality. For example, such signals may include car arrived/ride share pickup safety events such as:

(VLC) Luggage Compartment Open/Closed event—Car to Despatch API (instance along with time)

(VD) Door Count Opened event—Car to Despatch API (instance along with time period)

(VDC) Door Count Closed event—Car to Despatch API (instance along with time stamp)

(VS) Seat belt/s engaged event (counts number of passengers from booking with time stamp)

Passenger/s on board count status (once the a set time period is reached from the seatbelt engaged or disengaged time stamp has expired). The car may then be considered safe to proceed when all requirements are met.

Additionally, the intelligent vehicle safety events function 502 may receive vehicle status signals related to the vehicle reaching the end of its journey, such as:

Seat belt/s engaged/disengaged event (counts number of passengers from booking with time stamp)

Seat Sensor event (detects passenger present to trigger seat belt warning). The passenger in app may accept waver notice if an object is on the seat and doesn't require a seat belt. This event may also be used to verify passenger count for ride share and ride cost Door Count Opened event (instance along with time period)

Door Count Closed event (instance along with time stamp)

Luggage Compartment Open/Closed event (instance along with time stamp)

Journey on route to next stop (once the a set time period is reach from the door closed event or a time stamp has expired, the car may be considered ready to proceed to a further stop).

Journey Compete evet (journey complete event is the car completing all stops registered)

Car Available event

Car locked door

The intelligent passenger safety interaction function 504 may facilitate the provision of an AI-trained chatbot 510 that allows for the passenger to ask questions and provide an immediate response. Through the voice analytics channel 514, there may also be provided the ability to detect anxiety within the passenger's voice and consequently will trigger an intervention from the autonomous safety team 516 via live chat or a call. That is, the system may monitor the voice of passengers within a vehicle and in dependence on characteristics of that voice selectively activate a communication channel with the autonomous safety team 516.

The intelligent passenger alarm function 506 allows a passenger within the vehicle to trigger an alarm either through an app on the user device 112 or through the vehicle's own interface. This function may initiate a live video feed that will be presented to autonomous safety team 516. The autonomous safety team 516 may then engage with the passenger via live chat or a call or other suitable mechanism. The choice of mechanism may depend on vehicle occupancy count. In some embodiments, once an alarm is triggered the vehicle will automatically be sent an instruction to stop at the next available safe location unless overridden by a member of the autonomous safety team 516.

Figure 7:
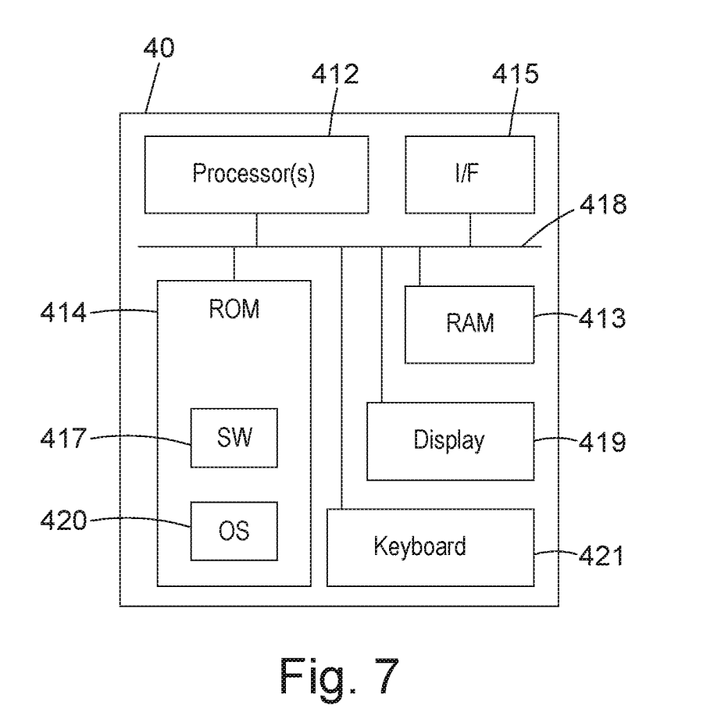
FIG. 7 is a schematic diagram illustrating components of a server forming part of the system of FIG. 1.

Whether the system 100 includes one or multiple servers, each server includes a number of features as will now be described with reference to FIG. 7. FIG. 7 shows one server 40. If the system 100 comprises plural servers, multiple versions of the FIG. 7 server 40 are connected together.

Each server 40 in the system 100 includes a processor 412. The processor 412 is connected to volatile memory such as RAM 413 by a bus 418. The bus 418 also connects the processor 112 and the RAM 413 to non-volatile memory, such as ROM 414. A communications interface 415 is coupled to the bus 418, and thus also to the processor 412 and the memories 413, 414. The interface 415 is connected to a radio network in any suitable way, for instance via the Internet or a local network. Within the ROM 414 is stored a software application 417, which includes program code that causes the server to perform the functions required of it. An operating system (OS) 420 also is stored in the ROM 414.

An output device such as a display 419 may be provided with the server 40. An input device such as a keyboard 421 may be provided with the server 40. This allows configuration, monitoring and updating by administrators and other users as required.

The server 40 may take any suitable form. Generally speaking, the server 40 comprises processing circuitry 412, including one or more processors, and a storage device 414, 413, comprising a single memory unit or a plurality of memory units. The storage device 414, 413 stores computer program instructions that, when loaded into the processing circuitry 412, control the operation of the server 40.

Figure 6:
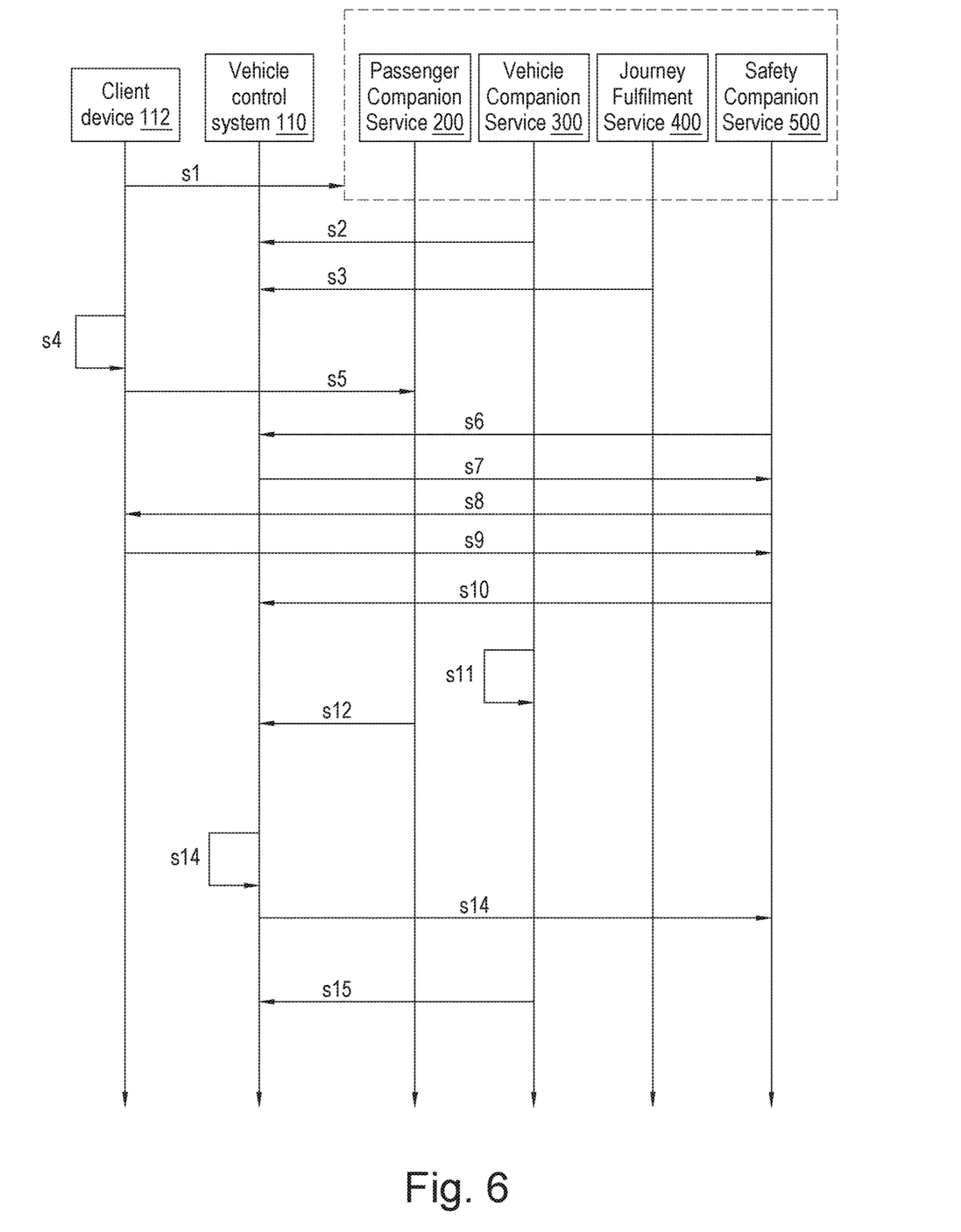
FIG. 6 illustrates exemplary operation of the services of FIGS. 2 to 5.

In use, as illustrated in FIG. 6, a customer may submit a booking request (at step s1) through an app downloaded on user device 112. This request may comprise passenger identity details together with details of the proposed booking. A vehicle is then allocated to the booking. Passenger companion service 200 may identify the passenger and passenger preferences, passing these through vehicle companion service via vehicle interface 210 (at step s2) to be implemented at the vehicle allocated to the job. Journey fulfilment service 400 may communicate (at step s3) with the allocated vehicle to provide relevant journey instructions and to provide information to the passenger when the vehicle is on its way or has arrived.

When the passenger locates the vehicle (step s4), the passenger fulfilment service 200 via identity service channel 226 authenticates the passenger identity (step s5). The safety companion service 500 may then be invoked.

The safety companion service 500 instructs (at step s6) the vehicle to be unlocked to allow the passenger to enter. It then obtains multiple vehicle status signals (at step s7) associated with passenger activity. As noted above, this may comprises door opened/closed events, luggage compartment open/closed events, seat occupied notifications and seatbelt notifications, amongst others. In this manner the safety companion service 500 may ascertain whether the vehicle is safe to proceed with the journey, only authorising the vehicle to proceed once this has been confirmed. For example, the safety companion service may ascertain that all doors are closed prior to proceeding, or that all passengers are seated/ have engaged their seatbelts. The safety companion service 500 may also identify any additional, unauthorised passengers have entered the vehicle and prevent the vehicle proceeding in such circumstances unless appropriate changes are made to the booking. In this manner, the system can assist in ensuring the effectiveness and operational efficiency of ride-sharing bookings, for example.

In the event that the safety companion service 500 identifies that the passenger must be alerted to an aspect of the vehicle situation that does not allow the vehicle to proceed, it may provide an alert (step s8) via either the user device 112 or through a user interface provided within the vehicle. In some circumstance, a user may interface with the app on their device 112 to respond (step s9) to such alerts (for example, by confirming that a bag is on a seat and thus no seatbelt is required). The user may also interface via a voice-controlled chatbot integrated with the vehicle and via AI chatbot channel 510 to receive and provide similar information.

There may be occasions on which it is beneficial for the user to be connected with autonomous safety team 516. In some circumstances, for example, the voice-controlled chatbot may be analyse the voice of the passenger and detect a level of anxiety that is above a threshold; in response, it may initiate contact between the passenger and the autonomous safety team 516. The autonomous safety team 516 may then engage with the passenger via live chat or a call or other suitable mechanism.

Where the vehicle is in motion there may be circumstances where the safety companion service 500 acts to instruct the vehicle to stop at the next safe opportunity.

Once the safety companion service 500 establishes it is safe to do so, it instructs the vehicle (at step s10) that it may proceed to its destination. The journey fulfilment service 300 may monitor this progress (at step s11) through the vehicle GPS, while the passenger companion service 200 may provide relevant information (at step s12) to the user throughout the journey via the AI data insight feed 220.

When the vehicle arrives at its destination (step s13), the system 100 may receive additional vehicle status signals from the vehicle (at step s14) to confirm satisfactory and safe completion of the journey. Further, the system may establish that the booking is complete via the reception of additional status signals indicating, for example, that the passengers have opened at closed the doors and are no longer present in the vehicle. The safety companion service 500 may act to remind passengers that they used the luggage compartment when entering the vehicle and monitor to see if luggage is retrieved via additional status signals from the vehicle. Again, alerts or notifications can be provided to the passenger to ensure that all necessary information is available.

Once it has been established that all passengers have left the vehicle it may be identified as empty and returned to the pool of vehicles for later allocation. At this point, the vehicle companion service 300 may act to return the environmental conditions of the vehicle to a default setting ready for the next booking by instructing the vehicle accordingly (step s15).

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

Reference to "computer-readable storage medium", "computer program product", "tangibly embodied computer program" etc., or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

It should be realised that the foregoing embodiments are not to be construed as limiting and that other variations and modifications will be evident to those skilled in the art and are intended to be encompassed by the claims unless expressly excluded by the claim language when taking into account equivalents. Some such alternatives and modifications will now be described.

In the above, journey cost calculation is performed at the time of a booking and the result returned to the customer requesting the booking. Cost calculation may alternatively be performed ahead of the booking being made (for instance on the basis of an agreed tariff), at the end of fulfilment of the booking, or at a later time.

Moreover, the disclosure of the present application should be understood to include any novel features or any novel combination of features either explicitly or implicitly disclosed herein or in any generalisation thereof and during prosecution of the present application or of any application derived therefrom, new claims may be formulated to cover any such features and/or combination of such features.

The invention claimed is:

1. A computer-implemented method of managing a fleet of autonomous vehicles, comprising:
   receiving at least one request for a passenger journey from a client device associated with a passenger;
   allocating an autonomous vehicle to the passenger from the fleet;
   receiving, from the client device, confirmation that the autonomous vehicle has reached the passenger;
   receiving, from the allocated autonomous vehicle, one or more vehicle status signals;
   authorising the autonomous vehicle to proceed with the passenger journey in dependence on the vehicle status signals;
   controlling the autonomous vehicle based on the authorisation;
   receiving confirmation from the allocated autonomous vehicle that the vehicle has reached a destination; and
   further comprising, subsequent to receiving confirmation that the passenger journey is complete:
     receiving one or more further vehicle status signals from the allocated autonomous vehicle; and
     identifying the vehicle as empty in dependence on the one or more further vehicle status signals.

2. A method according to claim 1, wherein the vehicle status signals comprise one or more door status indicators.

3. A method according to claim 2, wherein the vehicle status signals comprise one or more luggage compartment indicators.

4. A method according to claim 1, wherein the vehicle status signals comprise one or more seat occupied indicators.

5. A method according to claim 1, wherein the vehicle status signals comprise one or more seat belt engagement indicators.

6. A method according to claim 1, further comprising:
identifying a user profile from the request, the user profile indicating one or more vehicle environmental preferences;
transmitting instructions to the allocated autonomous vehicle to comply with the vehicle environmental preferences.

7. A method according to claim 6, wherein the vehicle environmental preferences comprise one or more of: temperature, lighting and audio preferences.

8. A method according to claim 1, further comprising:
transmitting one or more alerts to the client device in dependence on the vehicle status signals;
receiving one or more passenger responses to the alerts from the client device; wherein
authorising the autonomous vehicle to proceed with the passenger journey is further dependent on the one or more passenger responses.

9. A method according to claim 1, further comprising:
instructing the allocated autonomous vehicle to unlock one or more doors in response to receiving confirmation that the autonomous vehicle has reached the passenger.

10. A method according to claim 1, further comprising:
receiving confirmation from the client device that the passenger journey is complete.

11. A method according to claim 1, further comprising:
providing one or more further alerts to the client device in response to the one or more further vehicle status signals.

12. A method according to claim 11, further comprising:
receiving one or more passenger responses to the alerts from the client device; wherein
identifying the vehicle as empty is further dependent on the one or more passenger responses.

13. A method according to claim 1, further comprising:
returning the vehicle to a pool of vehicles for allocation subsequent to identifying the vehicle as empty.

14. Apparatus having at least one processor and at least one memory having computer-readable code stored thereon which, when executed, controls the at least one processor to manage a plurality of networked vehicle resources by performing the method of claim 1.

15. A non-transitory computer-readable storage medium having stored thereon computer-readable code, which, when executed by computing apparatus, causes the computing apparatus to manage a plurality of networked vehicle resources, by performing the method of claim 1.

* * * * *